Sept. 22, 1959 A. H. FRÖHLICH ET AL 2,904,834
HINGED SEALING RING FOR VULCANIZING APPARATUS
Filed July 30, 1956 3 Sheets-Sheet 1

INVENTORS
ADOLF FRÖHLICH &
BY EDWARD J. HARRIS

ATTORNEY

INVENTORS
ADOLF FRÖLICH &
EDWARD J. HARRIS
BY
ATTORNEY

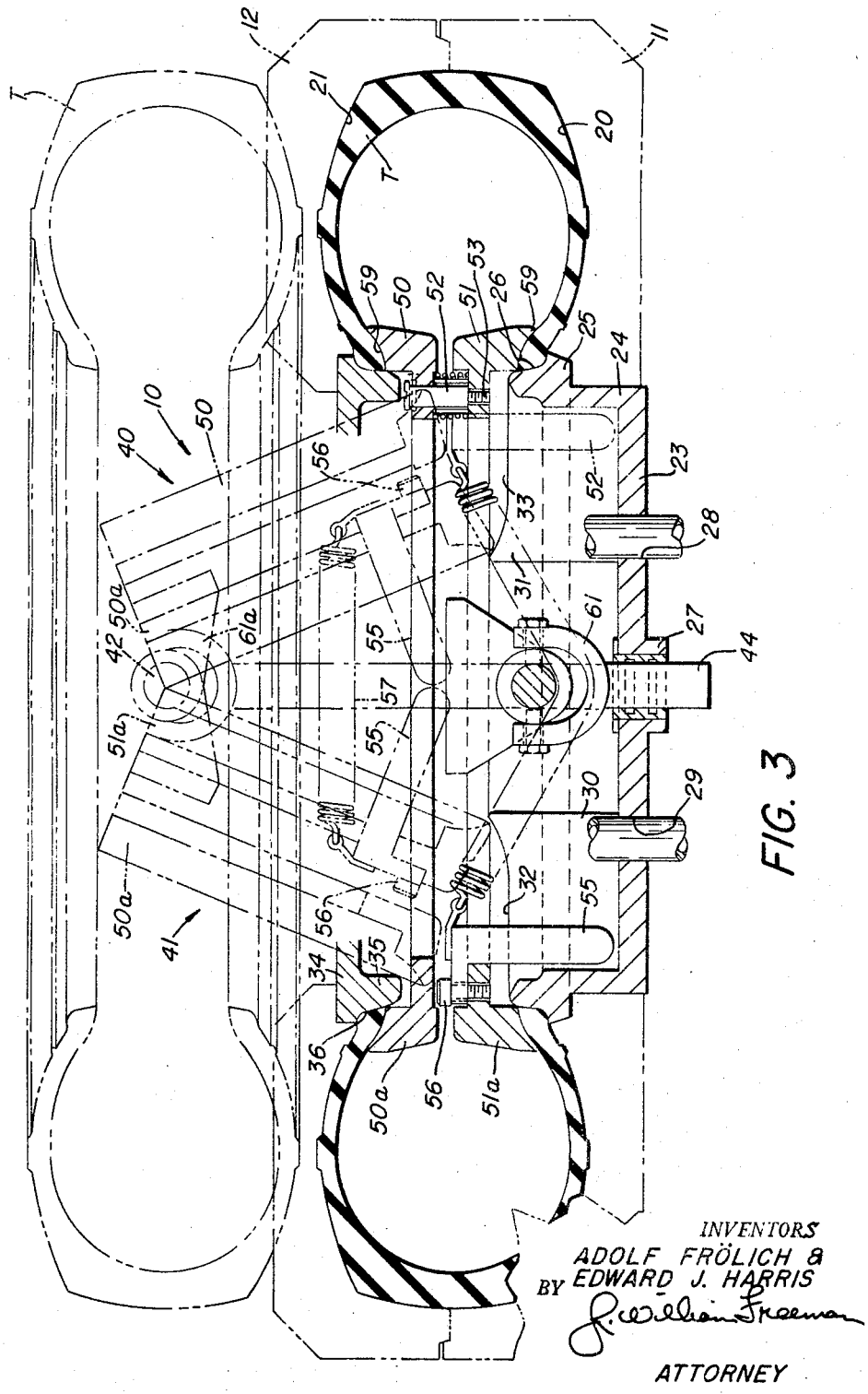

United States Patent Office

2,904,834
Patented Sept. 22, 1959

2,904,834

HINGED SEALING RING FOR VULCANIZING APPARATUS

Adolf H. Fröhlich and Edward J. Harris, Akron, Ohio, assignors to The Cleveland Trust Company, Cleveland, Ohio, as trustee Application July 30, 1956, Serial No. 600,935

8 Claims. (Cl. 18—17)

This invention relates to the art of pneumatic tire vulcanization, and in particular has reference to new and improved types of bead forming and sealing ring devices capable of utilization in the vulcanizing operation of the pneumatic tire.

In the past, the manufacture of pneumatic tires has been effectuated by first forming a plurality of fabric plies in flat form so as to build up a plurality of such layers in what is conventionally referred to as "flat-built" form. This flat-built tire is then positioned in the vulcanizing press where the same is shaped to a toroidal configuration by the use of pneumatic former that is automatically positioned interiorly of the tire during the vulcanizing operation.

A representative press of this general type is disclosed in detail in co-pending application Serial No. 480,517 filed January 7, 1955, by Adolph Fröhlich.

While the above type structure has generally been accepted, the same has been found disadvantageous in that it requires the use of a relatively complex mechanism to effectuate the timed entrance and withdrawal of a pneumatic former. Additionally, such formers have been found to have a relatively short duration of use and must be replaced frequently to thus add to the overall cost of manufacturing with an attendant increase in the cost of the overall tire per se.

It has been proposed in the past to vulcanize pneumatic tires without the use of a pneumatic former of the type above-described. However, such efforts have been unsatisfactory in view of the fact that it was heretofore impossible to provide an efficient type of inner bead seal forming mechanism that would serve the dual purpose of creating an air-tight seal at the bead area of the tire being cured, while simultaneously being easy to install and remove prior to and after the completion of the vulcanizing operation.

With specific reference to the problem of creating an air-tight seal in the internal bead walls, it is the conventional practice in the past to make an annular ring of fixed radial and axial dimensions that was positioned between the tire beads upon closure of the mold sections. Because of the fixed axial dimensions of such rings, it becomes apparent that the same are not able to automatically compensate for any variation in the spacing that exists between the spaced bead walls of the tire after the same have been formed. Thus, if the cross-sectional diameter of these beads sections has been made undersized during the manual tire-building operation, it is apparent that the fixed diameter ring will not be able to axially expand to seal off the void that occurs in such cases. In contrast, if the bead sections are made oversized, it becomes apparent that extreme pressure will be exerted upon the same with the result that deformation will occur to the detriment of the ultimate product.

In addition to this disadvantage, present-day sealing rings of this type are impractical due to the fact that the same are provided with a fixed radial dimension. Because the extreme periphery of such rings must be received interiorally of the bead portion of the formed tire, it is apparent that sealing rings of this type are, in reality, oversized with respect to the diameter of the bead portions and accordingly, the same must be hand-placed inside the tire. It follows that during such placement operation, the tire must be somewhat deformed to permit the passage of the ring therethrough due to the fact that the ring diameter is greater than the bead diameter. It is believed apparent that although inconvenient, this type ring may be utilized in smaller size tires such as passenger tires. However, when larger size tires, having a greater number of fabric plies are encountered, as in the case of manufacturing truck tires, for example, the manual positioning of the ring becomes virtually impossible with the result that the positioning and removal thereof must be done by automatic equipment of an expensive and complex nature.

In co-pending application of Adolf Fröhlich and Edward J. Harris, for Hinged Inner Bead Forming and Sealing Ring for Vulcanizing Presses, Serial Number 565,721, filed August 21, 1955, there was disclosed an improved type of hinged bead ring that overcame the objections above set forth, in view of the fact that the same had the radial dimension thereof changeable so that the overall ring could be contracted during the mounting of the tire on the vulcanizing press. Specifically, in this regard there was employed a hinged type of sealing ring wherein the ring per se was divided into two semi-hemispherical segments which were pivotally hinged about a transverse rod so as to permit collapsing of the same in the manner fully described in the case.

While the subject matter of the above referred to co-pending application has been found satisfactory in general, it is found that the same does not entirely overcome the disadvantage of the difference in diameter between the bead and the ring due to the fact that while the bead portion is collapsed to present a reduced diameter on two faces, there remains a fixed diameter on the remaining two sides that presents difficulty in insertion in the tire during the curing operation.

It has been discovered that if a sealing ring of the type set forth in the above referred to co-pending application is cocked about its axis of hinging during the forming operation, that the bead portion of the tire can easily be positioned over the same in view of the fact that the cocking presents a reduced effective diameter that will easily clear the tire.

It accordingly becomes the principal object of this invention to provide an improved type of vulcanizing ring that is characterized by the fact that the same is capable of being collapsed and tilted or "cocked" to facilitate easy reception within an uncured tire of "flat-built" form.

It is the still further object of the invention to provide an improved type of hinged sealing ring for inner bead forming mechanism that is characterized by the fact that the same is simple to use and is efficient in operation.

These and other objects of the invention will become more apparent upon a reading of the following brief specification considered and interpreted in the light of the accompanying drawings.

Of the drawings:

Figure 3 is a view taken substantially on the lines 3—3 of Figure 2.

Figure 1:
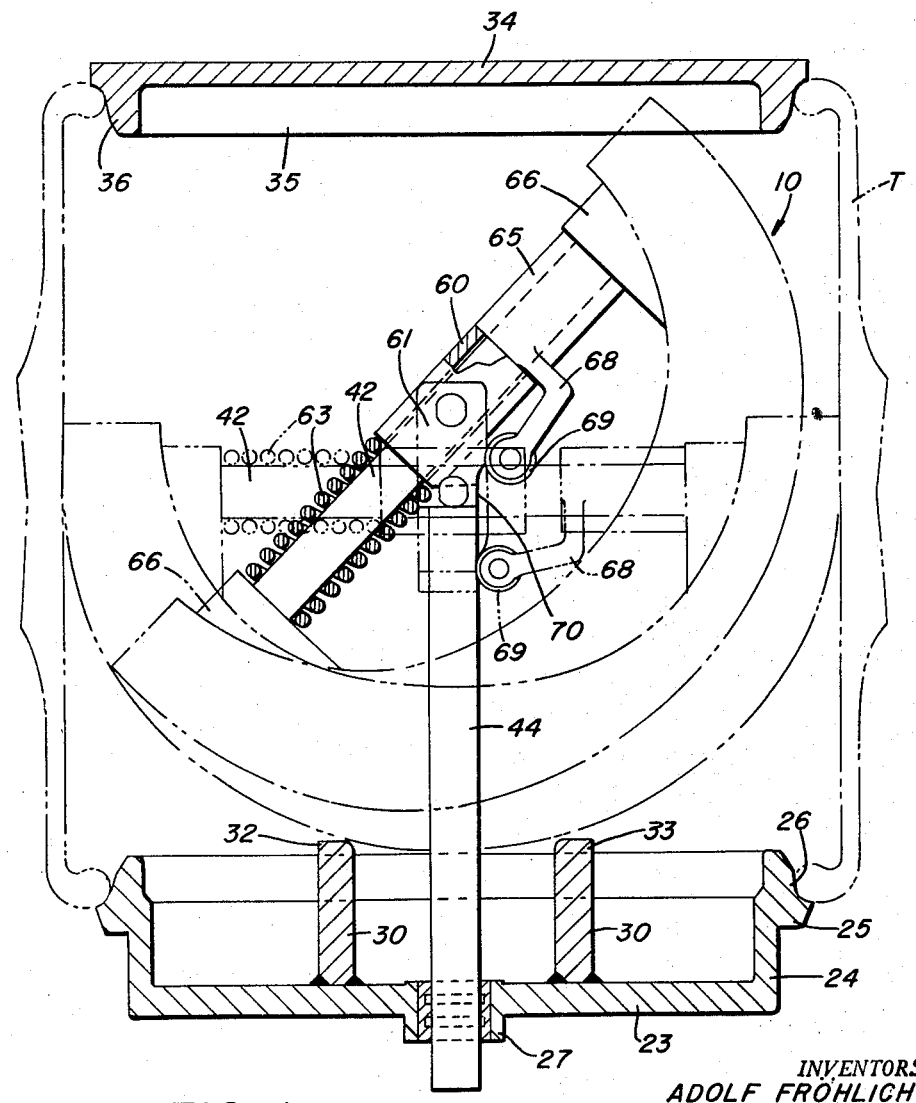
Figure 1 is an elevational view illustrating in full and chain-dotted lines the position of the component parts prior to closing of the mold sections.
Figure 2:
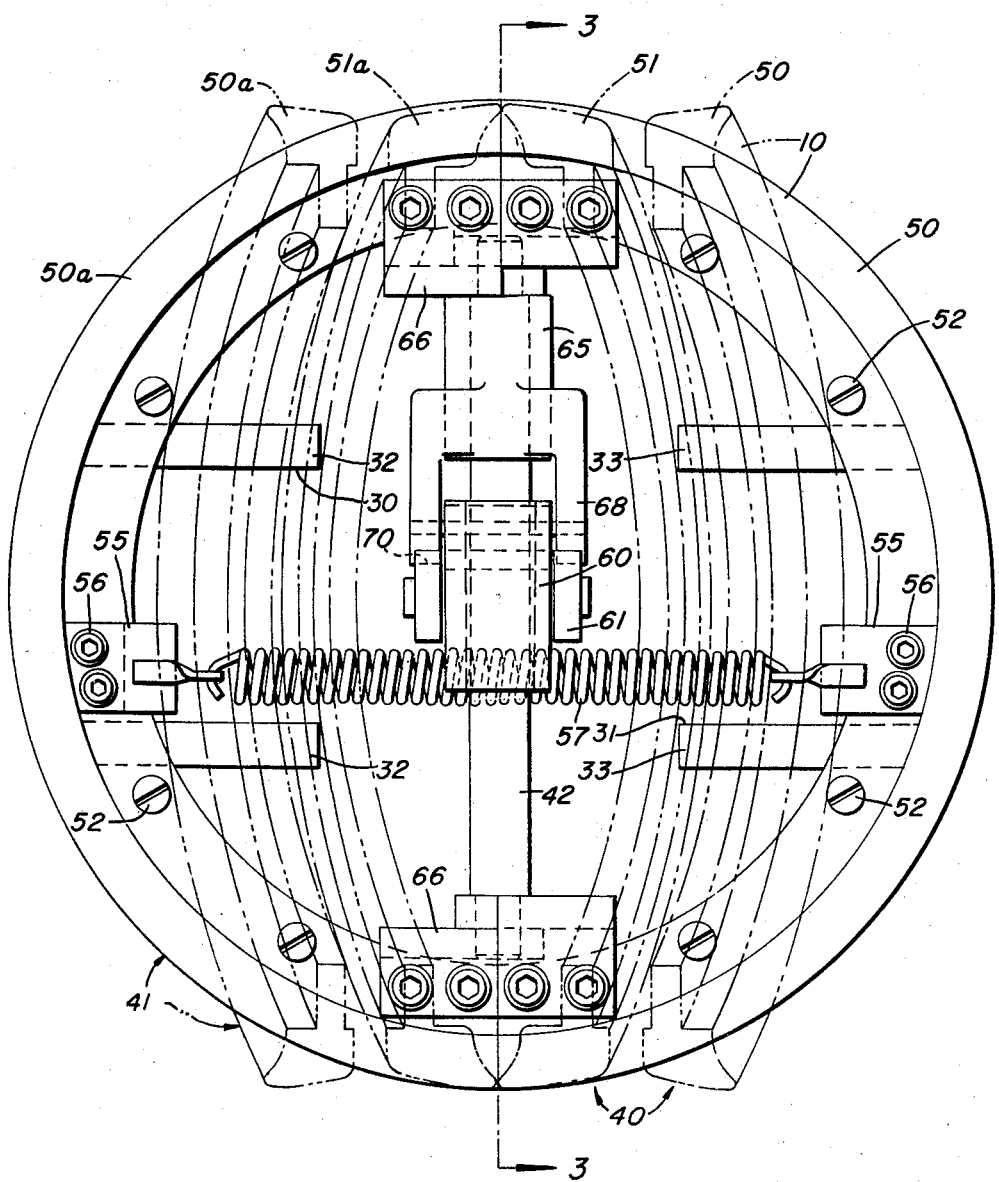
Figure 2 is a plan view of the improved vulcanizing ring and showing the position of the component parts in full and chain-dotted lines.

Referring now to the drawings and in particular to Figure 1 thereof, the improved bead ring, generally designated by the numeral 10, is shown carried by a lower mold section 11 so as to coact with certain component parts of an upper mold section 12 to accordingly effectuate vulcanization of a pneumatic tire T that is shown in Figure 1 of the drawings as being in its flat or uncured state.

Referring first to Figure 3 for a description of the mold section 11, it will be seen that the same is of circular construction wherein an annular design imparting surface 20 is provided for the purpose of imparting configuration to the tire received therein. A similar surface 21 is also provided on the upper mold surface 12 with these mold sections 11 and 12 being semi-schematically illustrated in the drawings for the sake of clarity.

As best shown in Figure 3, the lower mold section 11 also receives therein a plate 23 that has an upturned peripheral flange 24, the outer end 25 of which is formed to define a bead seat 26 upon which the bead portion of the tire T may be received. The plate 23 additionally includes an enlarged central boss 27 as well as apertures 28, 29 through which vulcanizing medium may be admitted and distributed by use of conduits of known type. Additionally, as best shown in Figure 1 of the drawings, the plate member 23 has secured thereto upwardly projecting transversely extending rib plates 30 and 31 that are formed, as shown in Figure 3, with contoured edge portions 32 and 33 that serve as a cam surface for the ring member 10, as will be presently described.

With reference to the upper mold section 12, it will be noted that the same also includes a plate 34 which has a depending endless flange 35, the outer face 36 of which is formed for reception against the upper bead of the tire T as best shown in Figure 1 of the drawings. By use of the plates 23 and 34, it is believed apparent that a closed chamber is defined by the mold sections 11 and 12 when the same are in the full line position of Figure 3 of the drawings.

Turning now to the construction of the ring member 10, per se, it will be seen that the same is generally defined by a pair of semi-circular forming elements that are indicated generally by the numerals 40 and 41 and which are pivotally mounted about a central shaft 42 so as to be swingable between the full and chain-dotted line position of Figure 3 upon vertical actuation of shaft 44 as will presently be described.

As is best shown in Figure 3, the ring section 40 is defined by a pair of axially spaced semi-circular rings 50 and 51, while the semi-circular ring unit 41 is defined by spaced semi-circular rings 50a and 51a. To the end of making the just described individual semi-circular ring segments axially shiftable with respect to each other, the ring members 50 and 50a are shown includinng pins 52 which thread as at 53, into the ring members 50 and 50a apart from the ring members 51 and 51a. In addition to the aforementioned component parts, the ring members 51 and 51a further include angular brackets 55 that are mounted, as shown in Figure 3, by bolts 56, 56 to the individual ring 51 and 51a near the outer periphery of the same. As is best shown in Figure 3, these brackets 55—55, engage each other in the collapsed position to limit the extent of hinged collapse about the shaft 42 with spring 57 initiating such collapse in the normal course of events. Additionally, in this regard, it is to be noted that each ring segment is formed with a contoured surface 59 that engages the inner bead wall of the tire T as shown in the drawings.

To the end of facilitating movement of the ring unit 10 between the full and chain-dotted line positions of Figure 1 to effectuate "cocking" thereof, the shaft 42 is shown surrounded by a bushing 60 that is axially shiftable with respect thereto and that is pinned to yoke 61 (see Figure 3) that is in turn pinned to the vertical shaft member 44. In this manner, the shaft 42 may be shifted angularly of the vertical shaft member 44 with stop 63 limiting the extent of the angular movement of the bushing 60. A spring 63 surrounding the shaft 42 and being engaged at one end by the bushing 60 urges the same upwardly and to the right of Figure 1 with the extent of such movement being limited by a second bushing 65 that also surrounds the shaft 42 and is fixed to a bracket 66 that is fixed with respect to the ring sections 50, 50a, 51 and 51a. In this manner, the entire ring assembly 10 may shift relatively of the upright shaft 44 with the axial location of the bushing 60 on shaft 42 controlling the positioning thereof. If desired, an auxiliary spring may be interposed between one end of shaft 42 and shaft 44 to increase the cocking action.

In addition to the aforementioned component parts and for purposes to be described, the bushing 65 further includes a depending and projecting arm 68 that has a roller 69 provided thereon with this roller 69 engaging a cam surface 70 that is provided on the yoke member 61 as best illustrated in Figure 1 of the drawings.

In use or operation of the improved device, it will first be assumed that the component parts are positioned as shown in Figure 1 with the mold section open and the ring unit 10 cocked at the chain-dotted line position thereof.

In this condition, a green tire T in its "flat-built" form may be easily passed over the collapsed and cocked ring section 10 in view of the fact that the diameter thereof will be larger than the effective obstructive diameter of the ring 10 in this position.

In this position, it is to be noted that the ring will maintain its cocked condition as a result of the force asserted by the spring 63 which operates to shift the bushing 65 into contact with the bushing 60.

Upon closing of the mold section, the bead seat 36 will engage the top bead of the tire T and upon further movement thereof the crown region of the tire T will radially expand towards a toroidal shape. At this time, the rod 44 may be moved downwardly in known manner and this downward movement will cause a two-fold action to occur with respect to the ring 10. First, as a result of the rings 51 and 51a contacting the surfaces 33 and 32 respectively, the ring 10 will be moved to the flat condition with the force of the spring 57 being overcome as a result of the downward force applied to the rod 44.

The second action that will occur will be that the just-described hinging action of the ring 10 will also result in the rod 42 being moved from the full to the chain-dotted line position of Figure 3, in view of the fact that the cammed engagement between the surfaces of the ring and the cam surface 33 will cause such cocking movement to overcome the force of the spring 63, with roller 69, as a result of its movement across cam surface 70 centering the bushing 60 with respect to the shaft 42.

Upon completion of the vulcanizing cycle the press sections may be opened and the rod 44 moved upwardly with the result that the action of the springs 57 and 63 will cause retraction and cocking of the unit 10 respectively to the chain-dotted line position of Figures 1 and 3. At this time the cured tire T may easily be passed over the collapsed ring and removed for repetition of the above described cycle of events.

It will be seen from the foregoing that there has been provided a new and novel type of vulcanizing ring that undergoes a compound collapsing and cocking movement so as to permit effective entry and withdrawal of a unformed tire with respect thereto.

While a detailed description has been made in accordance with the patent statutes, it is to be understood that equivalent products could be resorted to without departing from the spirit hereof or the scope of the appended claims.

This application is a continuation-in-part of co-pending application Serial No. 480,517, filed January 7, 1955, by Adolf Fröhlich and is also a continuation-in-part of application Serial No. 565,721, filed August 21, 1955, by Adolf Fröhlich and Edward J. Harris.

What is claimed is:

1. A vulcanizing press of the character described, comprising: a pair of complemental, relatively movable mold sections movable between open and closed positions; a shaft projecting axially of one said mold section in an axially shiftable relationship therewith; a frame member pivoted in its central portion to the projecting end of said shaft a pair of semi-circular head segments hinged together at their arcuate ends about opposed ends of said frame member; means for moving said bead segments into coplanar relationship with each other upon closing of said press; and means for rotating said frame member about said shaft at its point of pivotal connection therewith.

2. A vulcanizing press of the character described, comprising: a pair of complemental, relatively movable mold sections movable between open and closed positions; a shaft projecting axially of one said mold section in an axially shiftable relationship therewith; a frame member pivoted in its central portion to the projecting end of said shaft a pair of semi-circular head segments hinged together at their arcuate ends about opposed ends of said frame member; means for moving said bead segments into coplanar relationship with each other upon closing of said press; means for rotating said frame member about said shaft at its point of pivotal connection therewith; and means for normally retaining said frame member out of parallel with at least one said mold section.

3. The device of claim 2, further characterized by the fact that said frame rotating means include a bushing surrounding said frame member in axially shiftable relationship therewith and being rotatably pinned to said shaft; and a spring surrounding said frame and urging said bushing out of a central position on said frame member.

4. A vulcanizing press of the character described, comprising: a pair of complemental, relatively movable mold sections movable between open and closed positions; a shaft projecting axially of one said mold section in an axially shiftable relationship therewith; a frame member pivoted in its central portion to the projecting end of said shaft a pair of semi-circular head segments hinged together at their arcuate ends about opposed ends of said frame member; means for moving said bead segments into coplanar relationship with each other upon closing of said press; means for rotating said frame member about said shaft at its point of pivotal connection therewith; and means for normally retaining said frame member out of parallel with at least one said mold section; said semi-circular segments normally being collapsed about said frame member so as to be out of coplanar relationship with each other.

5. A vulcaning press of the character described, comprising: a pair of complemental, relatively movable mold sections movable between open and closed positions; a shaft projecting axially of one said mold section in an axially shiftable relationship therewith; a frame member pivoted in its central portion to the projecting end of said shaft a pair of semi-circular head segments hinged together at their arcuate ends about opposed ends of said frame member; means for moving said bead segments into coplanar relationship with each other upon closing of said press; means for rotating said frame member about said shaft at its point of pivotal connection therewith; and means for normally retaining said frame member out of parallel with at least one said mold section; said connecting means projecting from the lower of said mold sections.

6. A vulcanizing press of the character described, comprising: a pair of complemental, relatively movable mold sections movable between open and closed positions; a shaft projecting axially of one said mold section in an axially shiftable relationship therewith; a frame member pivoted in its central portion to the projecting end of said shaft a pair of semi-circular head segments hinged together at their arcuate ends about opposed ends of said frame member; means for moving said bead segments into coplanar relationship with each other upon closing of said press; means for rotating said frame member about said shaft at its point of pivotal connection therewith; and means for normally retaining said frame member out of parallel with at least one said mold section; said connecting means projecting from the upper of said mold sections.

7. The device of claim 5, further characterized by the fact that said lower mold section includes at least one transversely extending cam block that is engaged by said hinged bead ring means upon closing movement of said press.

8. The device of claim 6, further characterized by the fact that said lower mold section includes at least one transversely extending cam block that is engaged by said hinged bead ring means upon closing movement of said press.

References Cited in the file of this patent

UNITED STATES PATENTS

| | | |
|---|---|---|
| 1,700,889 | Heltzel | Feb. 5, 1929 |
| 1,989,363 | Iverson | Jan. 29, 1935 |
| 2,386,034 | Church | Oct. 2, 1945 |
| 2,571,258 | Kolins | Oct. 16, 1951 |